No. 764,970. PATENTED JULY 12, 1904.
F. C. YOUNG.
DEVICE FOR TEACHING PENMANSHIP.
APPLICATION FILED APR. 16, 1904.
NO MODEL.

No. 764,970. Patented July 12, 1904.

UNITED STATES PATENT OFFICE.

FRANK C. YOUNG, OF NEW HAVEN, CONNECTICUT.

DEVICE FOR TEACHING PENMANSHIP.

SPECIFICATION forming part of Letters Patent No. 764,970, dated July 12, 1904.

Application filed April 16, 1904. Serial No. 203,445. (No model.)

*To all whom it may concern:*

Be it known that I, FRANK C. YOUNG, of New Haven, in the county of New Haven and State of Connecticut, have invented a new and useful Improvement in Devices for Teaching Penmanship; and I do hereby declare the following, when taken in connection with the accompanying drawings and the letters of reference marked thereon, to be a full, clear, and exact description of the same, and which said drawings constitute part of this specification, and represent, in—

Figure 1:
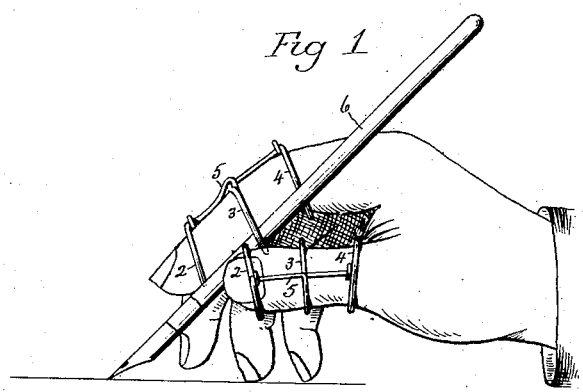
Figure 2:
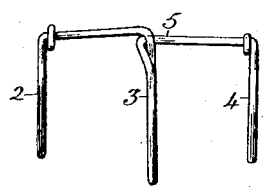

Figure 1, a side view of a hand showing my improved devices applied to the forefinger and thumb; Fig. 2, a side view of one of the devices detached.

This invention relates to an improvement in a device for teaching penmanship, or, in other words, a device to hold the fingers fixed in a position recognized by authorities as the proper one to assume in writing, the object of the invention being to produce a simple device which may be applied to the thumb or forefinger and so as to prevent bending at the joints; and the invention consists in the construction as hereinafter described, and particularly recited in the claims.

As herein shown, my device consists of three rings 2, 3, and 4 arranged in parallel planes and connected by a bar 5, the device being preferably formed from a single piece of wire. The size of the rings and the space between them will depend upon the size of the hand of the user.

One of my improved devices will be worn upon the forefinger, with the bar 5 at the back of the finger, and, if desired, a second device may be worn upon the thumb, the bar 5 also being arranged at the back and so as to pass over the middle joint. These devices prevent the undue bending of the forefinger and thumb, and with these fingers straight the hand will naturally assume the proper position.

If desired, the middle ring 3 of the device for the forefinger may be larger in diameter than the rings 2 and 4 and so as to permit a pencil or penholder 6 to pass through it, as shown in Fig. 1; but this is not essential.

Having fully described my invention, what I claim as new, and desire to secure by Letters Patent, is—

1. A device for teaching penmanship consisting of three rings arranged in parallel planes and integrally connected, substantially as described.

2. A device for teaching penmanship consisting of three rings arranged in parallel planes and integrally connected, the middle ring being of greater diameter than the end ring, substantially as described.

In testimony whereof I have signed this specification in the presence of two subscribing witnesses.

FRANK C. YOUNG.

Witnesses:
 FREDERIC C. EARLE,
 CLARA L. WEED.